United States Patent [19]

Huang

[11] Patent Number: 5,394,328
[45] Date of Patent: Feb. 28, 1995

[54] METHOD FOR ACTIVATING AN OCCUPANCT RESTRAINT IN A VEHICLE

[75] Inventor: Matthew Huang, Dearborn, Mich.

[73] Assignee: Ford Motor Company, Dearborn, Mich.

[21] Appl. No.: 202,297

[22] Filed: Feb. 25, 1994

[51] Int. Cl.⁶ .................. B60R 21/16; B60R 21/32
[52] U.S. Cl. ..................... 364/669; 340/669; 307/10.1; 280/734; 180/282
[58] Field of Search ........... 364/424.05; 340/436, 340/669; 280/734, 735; 180/274, 282; 307/10.1

[56] References Cited

U.S. PATENT DOCUMENTS

| | | | |
|---|---|---|---|
| 3,870,894 | 3/1975 | Brede et al. | 307/9 |
| 3,911,391 | 10/1975 | Held et al. | 340/52 |
| 4,979,763 | 12/1990 | Blackburn et al. | |
| 4,994,972 | 2/1991 | Diller | 364/424.05 |
| 5,021,678 | 6/1991 | Diller | 307/10.1 |
| 5,040,118 | 8/1991 | Diller | |
| 5,067,745 | 11/1991 | Yoshikawa | 280/735 |
| 5,068,793 | 11/1991 | Condne et al. | |
| 5,157,268 | 10/1992 | Spies et al. | |
| 5,189,311 | 2/1993 | Moriyama et al. | 307/10.1 |
| 5,202,831 | 4/1993 | Blackburn et al. | |
| 5,216,607 | 6/1993 | Diller et al. | |
| 5,285,187 | 2/1994 | Hirao et al. | |

*Primary Examiner*—Kevin J. Teska
*Assistant Examiner*—Tyrone V. Walker
*Attorney, Agent, or Firm*—Roger L. May; Mark L. Mollon

[57] ABSTRACT

A method for activating an impact responsive device in a passenger vehicle is provided wherein a single point sensing device senses deceleration of the vehicle during an impact event. The sensed deceleration is integrated to determine velocity of the vehicle. The velocity is then integrated to determine displacement of the vehicle. The difference between the deceleration and a preselected deceleration bias is integrated over displacement to provide a residual energy density. This residual energy density is compared to the threshold residual energy density from a predefined activation threshold line which is selected based on the impact characteristics of the vehicle. When the residual energy density is equal to or exceeds the activation threshold line, the impact responsive device is activated.

14 Claims, 3 Drawing Sheets

METHOD FOR ACTIVATING AN OCCUPANCT RESTRAINT IN A VEHICLE

BACKGROUND OF THE INVENTION

The present invention relates generally to occupant restraint systems in passenger vehicles and, more particularly, to a method for activating an occupant restraint or other impact responsive system which utilizes a single sensor, discriminates between impact events in which the device is to be activated and impact events in which the device is not to be activated, and activates the device within a desired time period.

Impact responsive devices, such as air bags and fuel shut-off controls, are rapidly becoming standard features on most passenger vehicles. A conventional air bag inflates to protect the vehicle passengers in response to an acceleration force on the vehicle. Electromechanical sensors are mounted at various locations in the vehicle outside the passenger compartment, such as on the frame rails and radiator, to detect the impact and activate the air bag.

In a collision, there are two types of crash pulses: one in the crush zone where the frontal frame structure absorbs energy in a crash, and the other in the occupant compartment where the undisturbed portion of the vehicle body remains rigid. The structural responses in the two zones are different. The crush zone undergoes rapid velocity change as it deforms early in the crash, and the occupant compartment experiences a rigid body deceleration with smaller deceleration magnitude and longer duration than those in the crush zone.

Most air bag sensors are of the ball and tube type. Inside each sensor, a gold-plated steel ball is held in place at the end of a short tube by a magnet. In a forward impact, the ball "breaks" free from the magnet and travels along the tube toward two electrical contacts. Crash sensors are located near the front of the vehicle and a "safing" sensor near the passenger compartment. The safing sensor is connected in series with the crash sensors. The air bag is deployed when at least one of the crash sensors and the safing sensor are activated and the activation times are overlapped. The safing sensor serves to confirm that a crash is so severe that it warrants an air bag deployment; and it also serves to prevent an air bag from inadvertent deployment in case there is an electrical short circuit in the crash sensor. However, systems employing such remote electromechanical sensors require multiple sensors and complex control systems.

In view of these deficiencies, vehicle designers have attempted to implement single point sensing systems which utilize a single electronic sensor, such as an accelerometer, in the passenger compartment of the vehicle. One such system is disclosed in U.S. Pat. No. 5,068,793 issued to Condne et al. The Condne et al. system utilizes a single accelerometer to generate a deceleration signal indicative of deceleration of the vehicle. The deceleration signal is then reduced by a variable deceleration threshold signal and the resulting signal is integrated over time. The variable deceleration threshold signal is a feedback signal taken from the integrated signal. When the integrated signal exceeds a triggering threshold value, an impact is detected.

Unfortunately, prior systems, such as the Condne et al. system, are based on a time domain analysis of the deceleration signal which has been found to be relatively inaccurate in discriminating between must-activate impacts and must-not-activate impacts. Further, prior systems have experienced difficulties in reacting to a must-activate impact within a desired activation time.

It is thus apparent that a need exists for a method for activating an impact responsive device which utilizes a single sensor, distinguishes between must-activate impacts and must-not-activate impacts, and activates the device within a desired time period.

SUMMARY OF THE INVENTION

This need is met by the method of the present invention wherein residual energy density is monitored during an impact event and compared to a preselected activation threshold window to activate an impact responsive device. The residual energy density is the portion of the energy density which exceeds a preselected deceleration bias g.

In accordance with one aspect of the invention, a method for activating an impact responsive device in a vehicle is provided. The method comprises the steps of: defining a deceleration bias value; defining an activation threshold window identifying when the device is to be activated; sensing deceleration of the vehicle; comparing sensed deceleration and the deceleration bias value to determine whether the sensed deceleration is greater than the deceleration bias value; determining displacement of the vehicle based on the sensed deceleration when the sensed deceleration is greater than the deceleration bias value; subtracting the deceleration bias value from the sensed deceleration to produce a threshold deceleration; integrating the threshold deceleration with respect to the displacement of the vehicle to determine residual energy density; and activating the device based on the residual energy density and the activation threshold window in the displacement domain.

Preferably, the step of providing an activation threshold window comprises the steps of: selecting an initial displacement value; selecting an initial energy density value, the initial displacement value and the initial energy density value defining an origin of the activation threshold window; and selecting a slope for a line extending from the origin to define the activation threshold window.

The step of activating the device may comprise the steps of: comparing the displacement of the vehicle to the initial displacement value to determine whether the initial displacement value is at least equal to the displacement; determining a threshold residual energy density based on the activation threshold window and the displacement of the vehicle if the initial displacement value is at least equal to the displacement; comparing the threshold residual energy density to the residual energy density to determine whether the residual energy density is at least equal to the threshold residual energy density; and activating the device if the residual energy density is at least equal to the threshold residual energy density.

An accelerometer may be provided at the tunnel-at-dash centerline of the vehicle to sense deceleration. Preferably, the step of determining displacement of the vehicle comprises the steps of: integrating the sensed deceleration to determine velocity of the vehicle; and integrating the velocity to determine the displacement of the vehicle.

The step of activating the device may comprise activating the device when the residual energy density is at least equal to the threshold residual energy density. The impact responsive device may be an air bag, a belt pretensioner, or a device to stop fuel flow in the vehicle.

These and other features and advantages of the present invention will become apparent from the following detailed description, the accompanying drawings and the appended claims.

DETAILED DESCRIPTION OF THE INVENTION

Figure 1:
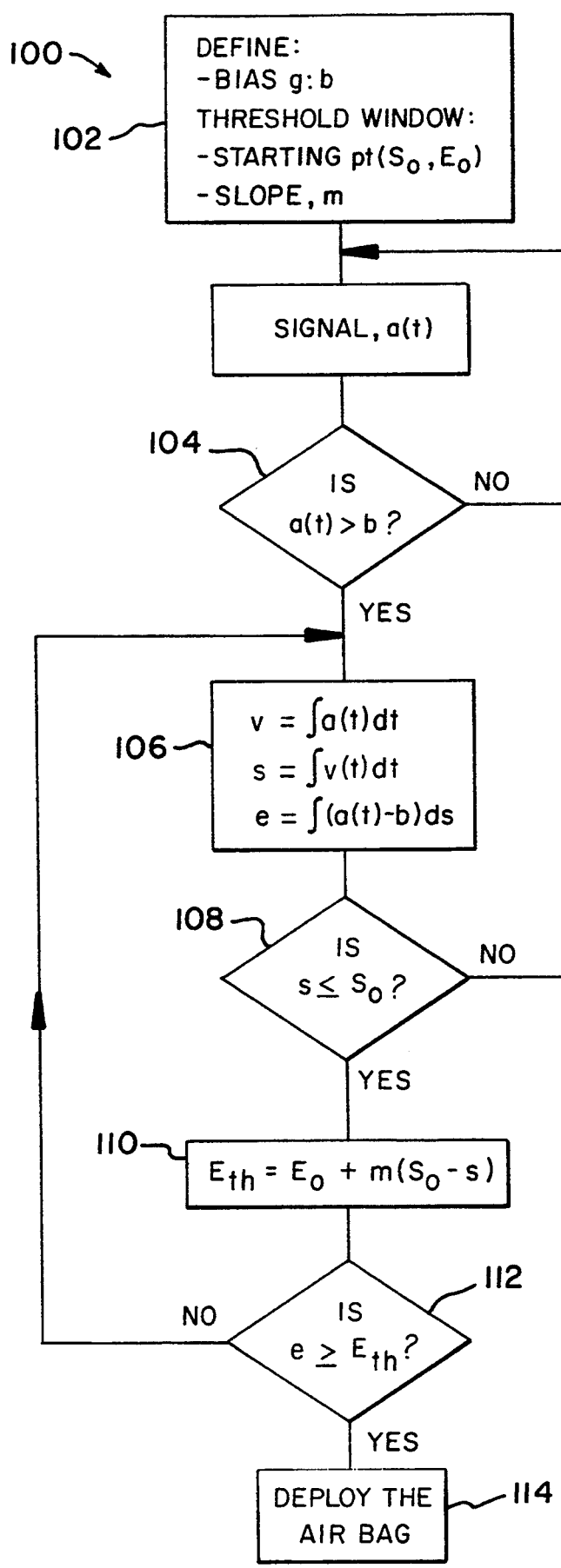
FIG. 1 is a flow chart illustrating the method of the present invention.

A flow chart 100 illustrating the method for activating an impact responsive device in accordance with the present invention is shown in FIG. 1. It should be understood that the method of the present invention may be advantageously employed in any passenger vehicle.

In the method of the present invention, a residual energy density is calculated in the displacement domain and compared to an activation threshold line to determine whether the impact responsive device should be activated. During operation of the vehicle, a single point sensing system or device, such as an accelerometer, senses acceleration and deceleration of the vehicle and generates a signal indicative thereof. The signal is then transmitted to an electrical circuit which stores and executes the method shown in FIG. 1.

Figure 2:
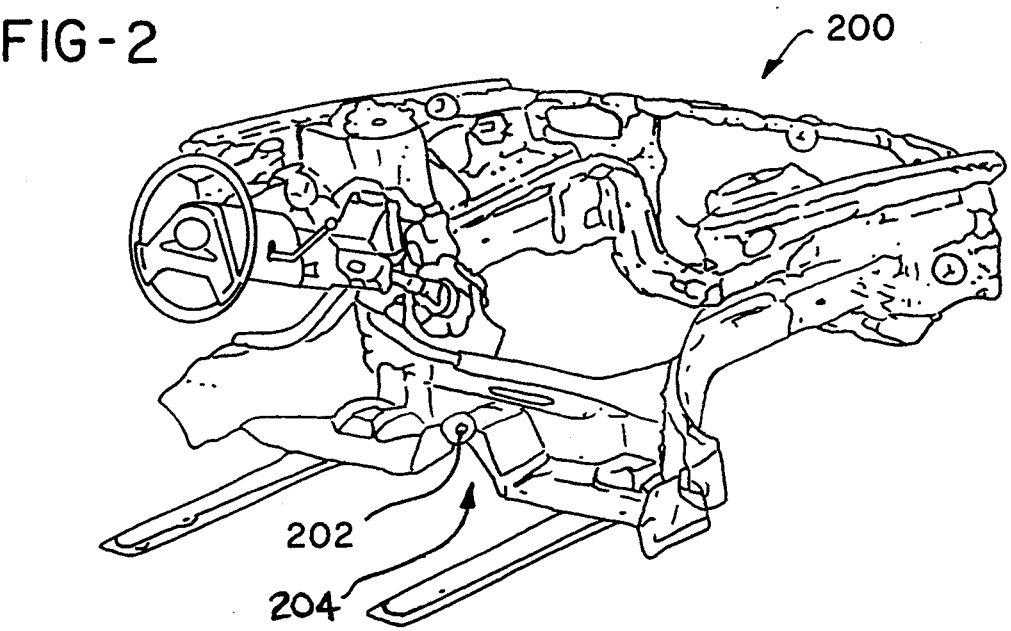
FIG. 2 is a perspective view of a chassis of a vehicle including an accelerometer located at the tunnel at dash of the vehicle.
Figure 3:
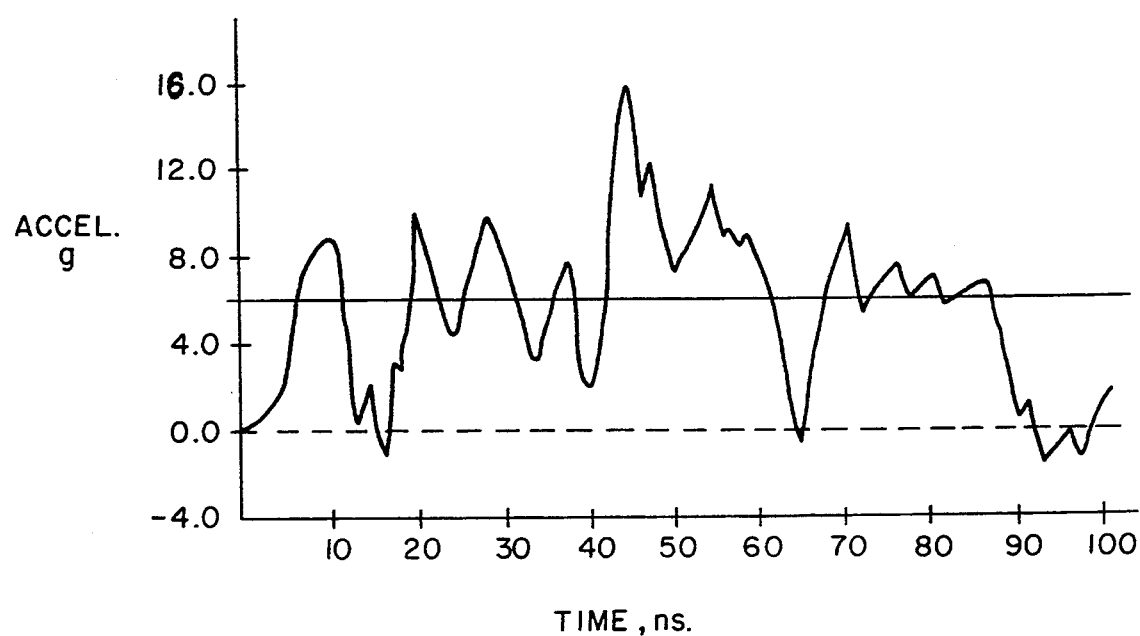
FIG. 3 is a graphical representation of the acceleration of a vehicle over time during an impact condition.

As shown on the chassis 200 in FIG. 2, the accelerometer 202 is preferably mounted at the tunnel at dash panel 204 on the centerline of the vehicle. However, any number of locations may be suitable for mounting the accelerometer 202. The tunnel at dash panel 204 location is preferred since this position is symmetrically located in the vehicle, is structurally rigid and is protected from corrosion.

In executing the method of the present invention, three control variables are initially defined based on the characteristics of the passenger vehicle which contains the impact responsive device. The characteristics of the vehicle are readily determined by subjecting the vehicle to different impact events and monitoring vehicle parameters, such as deceleration, velocity, etc., during the tests. As noted the impact responsive device may be any device which is activated upon impact, such as an air bag. A deceleration bias, represent by variable b, is selected in step 102 based on an average deceleration level calculated from the test results for the vehicle during an impact event which does not warrant triggering the impact responsive device. One possible must-not-activate impact event is an 8 mph perpendicular collision with a barrier. Values for the deceleration bias b typically range from 4 to 6 times the force of gravity g. For example, a deceleration bias b of 5 g will be employed in the following example.

Figure 4:
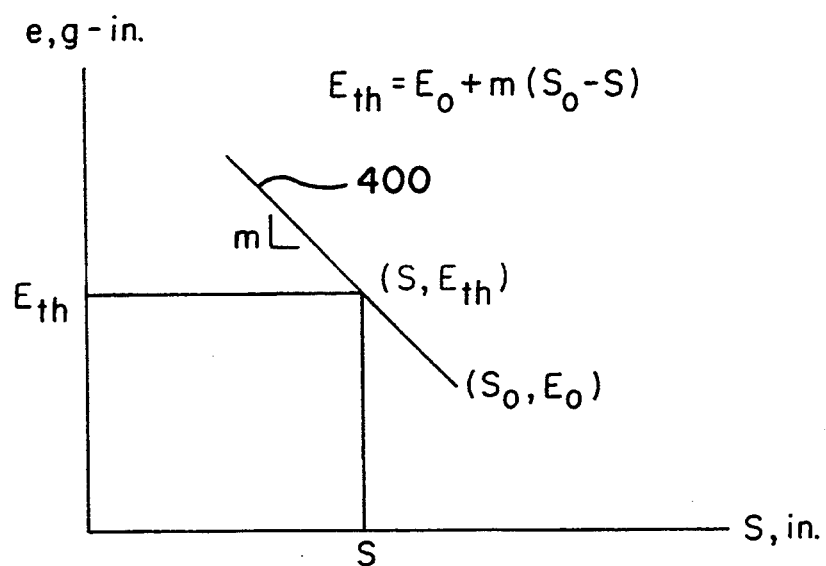
FIG. 4 is a graphical representation of an exemplary activation threshold window showing the origin ($S_o$, $E_o$) and slope m.

An origin and a slope m of a line extending from the origin are also selected in step 102 to define an activation threshold line, or window. The origin comprises an initial displacement value $S_o$ and an initial energy density value $E_o$. An activation threshold line 400 is shown in FIG. 4 having a slope m and an origin ($S_o$, $E_o$). The horizontal axis of the graph of FIG. 4 is the displacement S during impact of the vehicle in inches. The vertical axis is residual energy density e in units of g-inch.

The origin ($S_o$, $E_o$) of the activation threshold line 400 is selected such that the residual energy density for an impact which must not activate the impact responsive device is below the initial energy density value $E_o$. The slope m of the activation threshold line 400 is selected such that, during a test impact which must activate the impact responsive device, the intersection of the residual energy density curve and the activation threshold line 400 in the residual energy density versus displacement plot determines the activation time of the device.

After selecting the deceleration bias b and the origin ($S_o$, $E_o$) and slope m of the activation threshold line 400, the system is ready to discriminate between must-not-activate and must-activate impact events and to activate the impact responsive device accordingly. In step 104, a deceleration signal a(t) generated by the accelerometer 202 is compared to the deceleration bias b. If the deceleration signal a(t) is greater than the deceleration bias b, the deceleration signal a(t) is integrated over time in step 106 to produce a velocity signal v indicative of the velocity change of the vehicle.

The velocity signal v is then integrated over time in step 106 to produce a displacement signal s indicative of the displacement change of the vehicle. Further in step 106, a residual energy density e is calculated by integrating the difference between the deceleration signal a(t) and the deceleration bias b, or a threshold deceleration value, over change in displacement.

It is then determined, in step 108, whether the displacement signal s is less than or equal to the preselected initial displacement value $S_o$. If the displacement signal s is greater than the initial displacement value $S_o$, the displacement signal s is outside the activation threshold line 400 and a must-activate condition is not present. However, if the displacement signal s is less than or equal to the initial displacement value $S_o$, the displacement signal s is within the activation threshold line 400 and a threshold residual energy density $E_{th}$ is determined in step 110.

The threshold residual energy density $E_{th}$ is preferably calculated from the equation:

$$E_{th} = E_o + m(S_o - s).$$

As should be apparent and as is shown in FIG. 4, the threshold residual energy density $E_{th}$ is the detected residual energy density e at the intersection of the vertical line at the displacement value S and the activation threshold line 400. The residual energy density e is compared to the threshold residual energy density $E_{th}$ in step 112. If the residual energy density e is greater than or equal to the threshold residual energy density $E_{th}$, the impact responsive device is deployed in step 114.

The must-activate and must-not-activate impact events can be defined, as known in the art, using kinematics and impact severity of an unbelted driver dummy in terms of steering wheel and windshield contact, for example. The desired activation times for various types of impact events are designated as computed activation times, and may comprise a range of values.

To determine the activation time and the displacement of the method of the present invention, an accelerometer is positioned at the tunnel-at-dash of a vehicle during various types of impact events to generate the deceleration signals a(t). The deceleration signals a(t) are applied to the method of FIG. 1 and the resulting activation times of an impact responsive device and the displacement of the vehicle are determined once the residual energy density e is greater than or equal to the threshold residual energy density, $E_{th}$.

Figure 5:
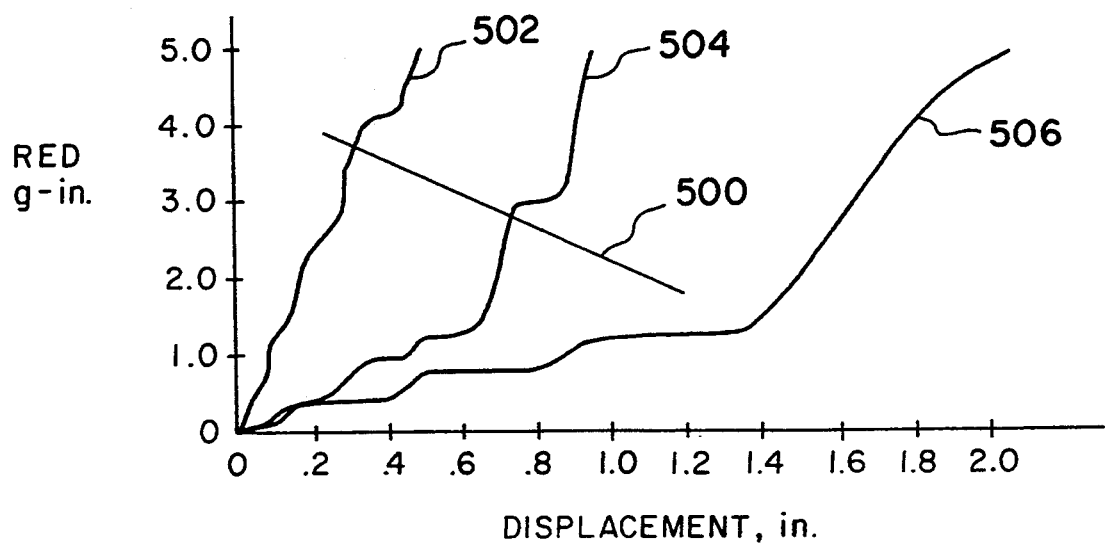
FIG. 5 is a graphical representation of residual energy density over displacement for a vehicle for three exemplary test impact conditions.

Hypothetical plots 502, 504 and 506 of residual energy density versus displacement including an exemplary activation threshold line 500 for three tests are shown in FIG. 5. The intersections of the residual energy density curve for each test and the activation threshold line define the displacement and the corresponding activation time at that displacement. The desired activation times for a typical vehicle may range from about 60 ms to about 20 ms.

The method of the present invention uses a single point sensor system to provide timely activation of an impact responsive device while distinguishing between must-activate and must-not-activate impact events. Single point sensor systems have previously had a longer activation time than conventional distributed frontal crush zone sensing systems, especially in non-perpendicular barrier impacts.

The present invention overcomes limitations in prior single point sensing systems by monitoring residual energy density versus displacement during an impact event. The residual energy density is the portion of the energy density which exceeds the deceleration bias. By monitoring the residual energy density versus displacement, the method of the present invention is able to distinguish between must-activate impacts and must-not-activate impacts, and activate the impact responsive device within a desired time period.

Having thus described the invention in detail by way of reference to preferred embodiments thereof, it will be apparent that other modifications and variations are possible without departing from the scope of the invention defined in the appended claims.

What is claimed is:

1. A method for activating an impact responsive device in a vehicle comprising the steps of:
   defining a deceleration bias value;
   defining an activation threshold line identifying when said device is to be activated comprises the steps of:
      selecting an initial displacement value;
      selecting an initial energy density value, said initial displacement value and said initial energy density value defining an origin of said activation threshold window; and
      selecting a slope for a line extending from said origin to define said activation threshold line;
   sensing deceleration of said vehicle;
   comparing sensed deceleration and said deceleration bias value to determine whether said sensed deceleration is greater than said deceleration bias value;
   determining displacement of said vehicle based on said sensed deceleration when said sensed deceleration is greater than said deceleration bias value;
   subtracting said deceleration bias value from said sensed deceleration to produce a threshold deceleration;
   integrating said threshold deceleration with respect to said displacement of said vehicle to determine residual energy density; and
   activating said device based on said residual energy density and said activation threshold line.

2. The method as recited in claim 1 wherein the step of activating said device comprises the steps of:
   comparing said displacement of said vehicle to said initial displacement value to determine whether said initial displacement value is at least equal to said displacement;
   determining a threshold residual energy density based on said activation threshold line and said displacement of said vehicle if said initial displacement value is at least equal to said displacement;
   comparing said threshold residual energy density to said residual energy density to determine whether said residual energy density is at least equal to said threshold residual energy density; and
   activating said device if said residual energy density is at least equal to said threshold residual energy density.

3. The method as recited in claim 1 wherein the step of activating said device comprises the step of activating an air bag.

4. The method as recited in claim 1 wherein the step of sensing deceleration of said vehicle comprises the step of providing an accelerometer in said vehicle.

5. The method as recited in claim 4 wherein the step of providing an accelerometer further comprises the step of providing said accelerometer at a tunnel-at-dash centerline of said vehicle.

6. The method as recited in claim 1 wherein the step of determining displacement of said vehicle comprises the steps of:
   integrating said sensed deceleration to determine velocity of said vehicle; and
   integrating said velocity to determine said displacement of said vehicle.

7. The method as recited in claim 1 wherein the step of activating said device comprises activating said device when said residual energy density is at least equal to said activation threshold line.

8. A method for activating an impact responsive device in a vehicle comprising the steps of:
   defining a deceleration bias value;
   defining an activation threshold line identifying when said device is to be activated;
   sensing deceleration of said vehicle;
   comparing sensed deceleration and said deceleration bias value to determine whether said sensed deceleration is greater than said deceleration bias value;
   determining displacement of said vehicle based on said sensed deceleration when said sensed deceleration is greater than said deceleration bias value;.
   subtracting said deceleration bias value from said sensed deceleration to produce a threshold deceleration;
   integrating said threshold deceleration with respect to said displacement of said vehicle to determine residual energy density; and
   activating said device based on said residual energy density and said activation threshold line by performing the step of stopping fuel flow in said vehicle.

9. A method for activating an impact responsive device in a vehicle comprising the steps of:
defining a deceleration bias value;
defining an activation threshold line identifying when said device is to be activated by performing the steps of:
selecting an initial displacement value;
selecting an initial energy density value, said initial displacement value and said initial energy density value defining an origin of said activation threshold line; and
selecting a slope for a line extending from said origin to define said activation threshold line;
sensing deceleration of said vehicle by means of an accelerometer;
comparing said sensed deceleration and said deceleration bias value to determine whether said sensed deceleration is greater than said deceleration bias value;
integrating said sensed deceleration of said vehicle to determine velocity of said vehicle when said sensed deceleration is greater than said deceleration bias value;
integrating said velocity of said vehicle to determine displacement of said vehicle;
subtracting said deceleration bias value from said sensed deceleration to produce a threshold deceleration;
integrating said threshold deceleration with respect to said displacement of said vehicle to determine residual energy density;
comparing said residual energy density and said activation threshold line to determine whether said residual energy density is at least equal to said activation threshold line; and
activating said device when said residual energy density is at least equal to said activation threshold line.

10. The method as recited in claim 9 wherein the step of sensing deceleration of said vehicle comprises the step of providing said accelerometer at a tunnel-at-dash centerline of said vehicle.

11. A method for activating an impact responsive device in a vehicle comprising the steps of:
defining a deceleration bias value;
defining an activation threshold line identifying when said device is to be activated;
sensing deceleration of said vehicle by means of an accelerometer;
comparing said sensed deceleration and said deceleration bias value to determine whether said sensed deceleration is greater than said deceleration bias value;
integrating said sensed deceleration of said vehicle to determine velocity of said vehicle when said sensed deceleration is greater than said deceleration bias value;
integrating said velocity of said vehicle to determine displacement of said vehicle;
subtracting said deceleration bias value from said sensed deceleration to produce a threshold deceleration;
integrating said threshold deceleration with respect to said displacement of said vehicle to determine residual energy density;
comparing said residual energy density and said activation threshold line to determine whether said residual energy density is at least equal to said activation threshold line; and
activating said device when said residual energy density is at least equal to said activation threshold line by performing the steps of:
comparing said displacement of said vehicle to said initial displacement value to determine whether said initial displacement value is at least equal to said displacement;
determining a threshold residual energy density from said activation threshold line and said displacement of said vehicle if said initial displacement value is at least equal to said displacement; and
comparing said threshold residual energy density to said residual energy density to determine whether said residual energy density is at least equal to said threshold residual energy density.

12. The method as recited in claim 11 wherein the step of sensing deceleration of said vehicle comprises the step of providing said accelerometer at a tunnel-at-dash centerline of said vehicle.

13. The method as recited in claim 12 wherein the step of activating said device comprises the step of activating an air bag.

14. The method as recited in claim 12 wherein the step of activating said device comprises the step of stopping fuel flow in said vehicle.

* * * * *